April 14, 1970  E. A. SCHOEFER ETAL  3,505,861

CAST SURFACE COMPARISON STANDARD

Filed March 4, 1968

INVENTORS.
ERNEST A. SCHOEFER &
GORDY E. LOFTIN
BY
*Bumbaugh, Free, Graves & Donohue*
their ATTORNEYS

United States Patent Office 3,505,861
Patented Apr. 14, 1970

3,505,861
CAST SURFACE COMPARISON STANDARD
Ernest A. Schoefer, Garden City, N.Y., and Gordy E. Loftin, Moorestown, N.J., assignors to Alloy Casting Institute, New York, N.Y., an unincorporated association of New York
Filed Mar. 4, 1968, Ser. No. 710,257
Int. Cl. G01b 5/28
U.S. Cl. 73—105                                4 Claims

ABSTRACT OF THE DISCLOSURE

The device described is a standard scale used for classification of surface finishes of castings and the like by visual and/or tactile comparison. The scale includes a plurality of separate areas, each formed with a particular standard overall roughness, against which the casting surface to be classified is compared. In addition, each area of the scale is provided with a number of raised protrusions of predetermined heights representing standardized classifications of irregularities on the general surface. Full grading of a particular casting surface includes a general smoothness figure and an irregularity rating, both obtained by visual and/or tactile comparison with the scale.

---

Figure 1:
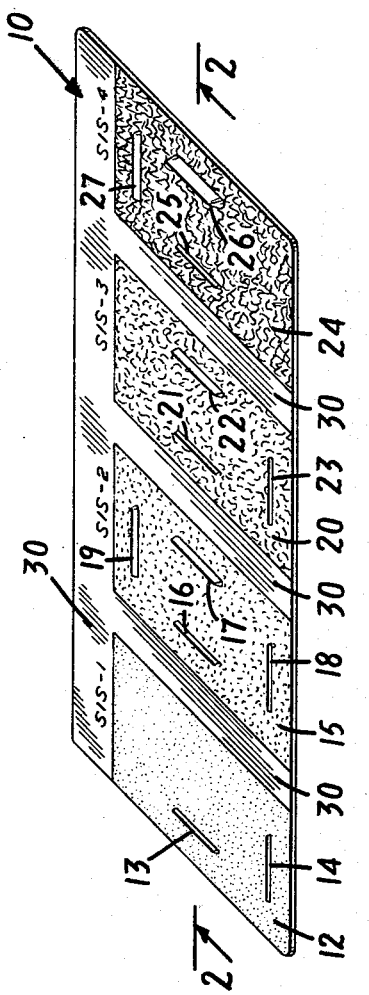

The present invention relates to surface indicator scales, and more particularly to a comparator scale enabling rapid and accurate classification of surfaces as to both general smoothness and size of random irregularities.

In various types of manufacturing processes, particularly those involving metals, surface finishes of parts play an important role in the function and appearance of the finished product. For this reason, specifications for the finished part or product often include requirements for particular surface finishes. In order that these surface finish requirements may be readily understood and met, standards have been adopted, establishing uniformity and simplifying design and manufacturing procedures.

Surface finish is usually measured in terms of the RMS (root mean square) value of variations from a nominal surface. The magnitude of such variations can be detected with instruments such as micrometer dial gauges, comparison microscopes, etc. and instruments of this type are often employed where extremely fine surface finishes are necessary or where a particular value of surface finish is critical to a given application.

In many areas, however, extreme accuracy of surface finish measurement is unnecessary and the experienced eye of a skilled inspector can sufficiently estimate the surface finish of a part within a range by comparison with a standard. Several forms of such standards are now in the prior art. One such standard comprises a plurality of annular elements whose peripheral surfaces are machined by various processes under accurately controlled conditions to provide a series of different surface finish samples. Another form provides essentially the same type of surfaces but arranged on a flat plate divided into separate areas.

These prior art comparator devices are limited to classification of surfaces produced by various processes, wherein the nature of the particular process itself insures that the overall surface will have a generally uniform finish. No comparator scale is known to exist heretofore which enables visual or tactile classification of surfaces with respect to both general smoothness characteristic and random, non-continuous, irregularity such as are characteristic of metal castings.

Accordingly, it is a primary object of the present invention to provide a surface indicator scale which enables classification of such surfaces in a reliable and accurate manner.

It is a further object of the present invention to provide a convenient and easily manipulated scale enabling both visual and tactile comparison with a surface for classifying the surface both as to general smoothness and the magnitude of irregularities.

Briefly, in accordance with the present invention, the surface indicator scale is provided with a plurality of separate areas, each of which is formed with a particular uniform degree of roughness, designated by an identifying character as a standard smoothness. Superimposed on each of the standard smoothness areas are a plurality of protrusions extending above the surface of different predetermined heights. The magnitudes of these protrusions are also selected in accordance with predetermined standards to provide references against which irregularities on the surface to be classified can be gauged with respect to height or depth. Since the standard protrusions are superimposed directly on the standard smoothness areas of the scale, an inspector can estimate more accurately, by sight and/or touch, the magnitudes of irregularities on the surface of the part being inspected. With the scale, therefore, the inspector is able to grade a particular casting, for example, with respect to overall smoothness and maximum surface irregularity accurately and rapidly.

Figure 2:
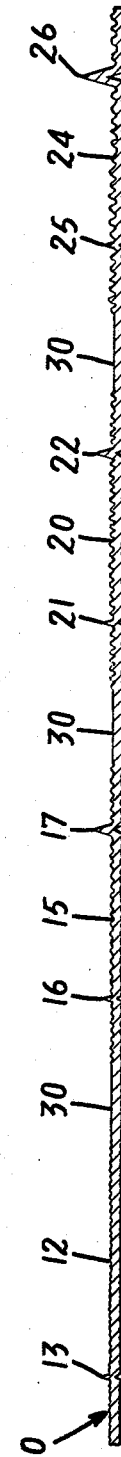

The foregoing and other objects, features and advantages of the present invention will become more apparent from the following detailed description thereof, when read in conjunction with the accompanying drawings in which FIGURE 1 is a perspective view of the surface indicator scale of the invention, and FIGURE 2 is a cross-section of the scale taken along the lines 2—2 of FIGURE 1.

Turning now to the drawings, the indicator scale of the present invention is shown as being in the form of a generally rectangular plate having upper and lower sides, 10, 11, respectively. The upper side includes a plurality of separate surface portions 12, 15, 20 and 24, each of which is roughened to a different extent, in a manner to be described hereinafter. The roughened surface portions may be separated by relatively narrow strips 30 which are finished to a relatively high degree of smoothness so as to distinguish readily from the operative portions of the scale. An additional smooth area 30 may be provided along an edge of the scale, as shown, for the application of appropriate lettering and indicia.

Extending upwardly from each of the surface portions 12, 15, 20 and 24, are one or more protrusions, shown in the form of raised ridges. Within each of the surface portions, the several protrusions differ in height, corresponding respectively to different standardized values of surface irregularities. Thus, for example, protrusion 14 will be higher than protrusion 13 within the surface portion 12. Similarly, protrusions 16 and 19 in surface portion 15, protrusions 21–23 of portion 20, protrusions 25–27 of portion 24 all represent different magnitudes of surface irregularities.

It should be understod that the configurations of the protrusions are not intended to simulate the geometry, length or width of irregularities to be found on the pieces to be inspected, but only to assist in estimating the height or depth of such irregularities.

As will be apparent from FIGURE 1, the successive surface portions 12, 15, 20 and 24 are arranged in order, from left to right, of increasing roughness of the general overall surface. This arrangement is desirable to permit more ready classification of an unknown surface that may fall somewhere between two of the predetermined standards on the scale.

Although any suitable way of fabricating these scales may be employed, it has been found most convenient to use the electroforming process which enables authentic reproduction of actual surfaces produced by the manufacturing process to which the scale it to apply. As illustrated in FIGURE 2, in employing the electroforming process, the under or reverse side 11 of the scale will bear a series of variations corresponding to but lesser in magnitude than those formed on the upper surface 10. After the forming process, the scale edges may be ground smooth and the surface areas 30 may be ground or polished to achieve the desired finish.

Although not limited to such use, the indicator scale of the present invention has found particular applicability to classification of surfaces of metal castings, e.g., iron-base and nickel-base high alloy castings. To classify the surfaces of such castings, three factors generally are specified: (1) general surface smoothness, (2) maximum magnitude of non-continuous surface irregularities (protrusions and depressions) and (3) frequency and distribution of such irregularities. By agreement within the industry, a set of standards has been established for classifying surface finishes as to these three factors and providing a basis by which the purchaser of a product may specify the type of surface finish he desires on a particular product.

As will be apparent, the scale of the present invention provides indications of only the first two of the foregoing criteria. The third is arrived at by a counting process carried out over a prescribed area of the surface.

In using the present invention to grade a particular casting, the inspector will examine the casting and compare its surface finish with the surface portions on the scale first to classify it as to general smoothness. As indicated in FIGURE 1, the present industry standards provide four general smoothness classifications, SIS (Surface Indicator Scale) Nos. 1 to 4. The inspector assigns to a particular surface the SIS number representing the standard next roughest to that being classified. In other words, specification of a surface by an SIS number means that the surface shall be as smooth as, or smoother than, the stated number.

After ascertaining the applicable SIS number, the inspector will then examine the irregularities on the casting surface and compare them with the protrusion standards on the applicable surface portion of the scale. For example, a casting having a general smoothness corresponding to SIS 1 (surface portion 12) may be classified into one of three grades. The first grade will be assigned to those castings having no irregularities at all. The next grade will be assigned to those castings having irregularities not exceeding the magnitude of protrusion 13, and the third grade will have irregularities which may exceed the magnitude of protrusion 13 but which will not exceed the magnitude of protrusion 14. Should the casting surface have an SIS 1 for general smoothness but irregularities exceeding the magnitude of protrusion 14, the casting would not conform to any of the industry standards.

The following table designates fifteen surface grades presently established in the industry:

TABLE

| Grade | SIS No. | Irregularities permissible, inch | |
|---|---|---|---|
| | | Depth | Height |
| I | 1 | None | None |
| II | 1 | 1/64 | 1/64 |
| III | 1 | 1/32 | 1/32 |
| IV | 2 | 1/64 | 1/64 |
| V | 2 | 1/32 | 1/32 |
| VI | 2 | 3/64 | 3/64 |
| VII | 2 | 1/16 | 1/16 |
| VIII | 3 | 1/32 | 1/64 |
| IX | 3 | 1/16 | 1/32 |
| X | 3 | 1/16 | 1/16 |
| XI | 3 | 1/8 | 1/16 |
| XII | 4 | 1/16 | 1/32 |
| XIII | 4 | 1/8 | 1/16 |
| XIV | 4 | 1/8 | 1/8 |
| XV | 4 | 1/4 | 1/8 |

It will be recognized that superimposing the protrusion standards directly on the smoothness scale areas, an inspector can classify irregularities on a casting, as to depth or height, more accurately and reliably than if the protrusions were located elsewhere on the scale, or on a separate scale.

The present indicator scale thus provides a convenient, rapid means for classifying surface finish of manufactured parts.

Although the invention has been described in connection with a scale for classifying the surface of alloy castings, it will be recognized that the principles thereof are equally applicable to the classification of any surface having both general smoothness and irregularity parameters. Moreover, it will be appreciated that the scale need not be arranged in the precise layout shown in FIGURE 1 and that other shapes, e.g., circular, square, as well as other arrangements of the surface portions and superimposed protrusions may be employed.

We claim:

1. A scale for classification of surface finish comprising a plate with at least one surface portion having a general overall roughness defining a standard for classifying general smoothness of a surface, said surface portion further including at least one protrusion extending a predetermined amount beyond the roughened surface thereof defining a standard for further classifying said surface as to magnitude of irregularities thereon.

2. A scale according to claim 1 wherein said scale includes a plurality of separate surface portions having respectively different general overall roughnesses for defining a plurality of standards, and wherein each of said surface portions includes a plurality of protrusions of different extents defining different standards for magnitude of irregularities.

3. A scale according to claim 2 wherein said surface portions are formed to simulate the surface configurations of metal castings and the magnitudes of said protrusions represent heights and depths of irregularities that may be found on metal casting surfaces.

4. A scale according to claim 3 wherein said plate is substantially flat and of a size conveniently held in the hand, the separate surface portions thereon disposed on one side of said plate and adjacent each other in order of successively increasing roughness.

References Cited

Casting Design Handbook, American Society for Metals, 1962, p. 90, FIG. I, "Cast surface comparison standard for visual estimation of the roughness of cast surfaces."

JAMES J. GILL, Primary Examiner

M. SMOLLAR, Assistant Examiner

U.S. Cl. X.R.

29—407; 164—4. 150